INVENTOR.
HERMAN K.A. DE LANGE
BY
Frank R. Trifari
AGENT

INVENTOR.
HERMAN K.A.DE LANGE
BY
AGENT

United States Patent Office 3,501,585

Patented Mar. 17, 1970

3,501,585

AUTOMATIC LEVEL CONTROL FOR RECORDING AND REPRODUCING VIDEO INFORMATION

Herman Kasper Adriaan de Lange, Klosterneuburg, Austria, assignor, by mesne assignments, to U.S. Philips Corporation, New York, N.Y., a corporation of Delaware Filed Jan. 18, 1967, Ser. No. 610,119

Claims priority, application Austria, Jan. 19, 1966, A 485/66

Int. Cl. H04n 5/17, 5/76

U.S. Cl. 178—6.6 5 Claims

ABSTRACT OF THE DISCLOSURE

A video recording channel is provided with an adjustable gain amplifier and a feedback rectifier for controlling the level of the video information signal applied to a modulator and in turn to a recording head. The reproducing channel includes a demodulator followed by a variable gain amplifier and a clamping circuit, both of which are provided with a common peak voltage rectifier feedback channel for insuring that the synchronizing pulses are maintained at a constant amplitude.

This invention relates to devices for recording and reproducing video information with the aid of a record carrier.

In devices for recording and reproducing signals the general aim is to obtain an advantageous signal-to-noise ratio. The present invention provides a device for recording and reproducing video information in which a very advantageous signal-to-noise ratio relative to known devices may be obtained.

To this end, a device according to the invention is characterized in that the recording channel includes a first automatic gain control for which the control signal is obtained by rectification of the video information and by which the total amplitude of the video information is adjusted to the maximum level which corresponds to optimum recording, and that for reproducing the recorded signal the reproducing channel includes a second automatic gain control for which the control signal is obtained by rectification of the reproduced synchronising pulses only and by which the amplitude of the video information is adjusted to a value at which the synchronising pulses invariably have a constant amplitude, preferably the standard value of, for example, 0.4 volts.

The control signal in the recording channel is advantageously obtained by rectification of the complete video information including the synchronising pulses. It is thus achieved that fluctuations in the amplitude of the synchronising pulses are also taken into account in the control. However, it would in principle, also be possible to use the video information alone for obtaining the control signal.

For recording video information use is frequently made of a method in which the video information is recorded in the form of a frequency-modulated carrier signal. In such a method the signal-to-noise ratio may also be improved when using the invention by maintaining the degree of modulation of the carrier constant at its maximum value by means of a control in the recording channel, which control is neutralised in the reproducing channel. Thus, for example, the control during recording may take place in the modulator stage. However, it is advantageous during recording if the amplitude of the video information is first controlled and this information is converted only thereafter into the frequency-modulated signal to be recorded. The control signal may then be obtained either from the signal forming the video information, or may advantageously be obtained only from the frequency-modulated signal by demodulation and rectification thereof. In the last-mentioned case, fluctuations in the degree of modulation which occur, for example, in the modulator are also included in the control.

In order that the invention may be readily carried into effect, it will now be described in detail, by way of example, with reference to the accompanying diagrammatic drawings, in which.

Figure 1:
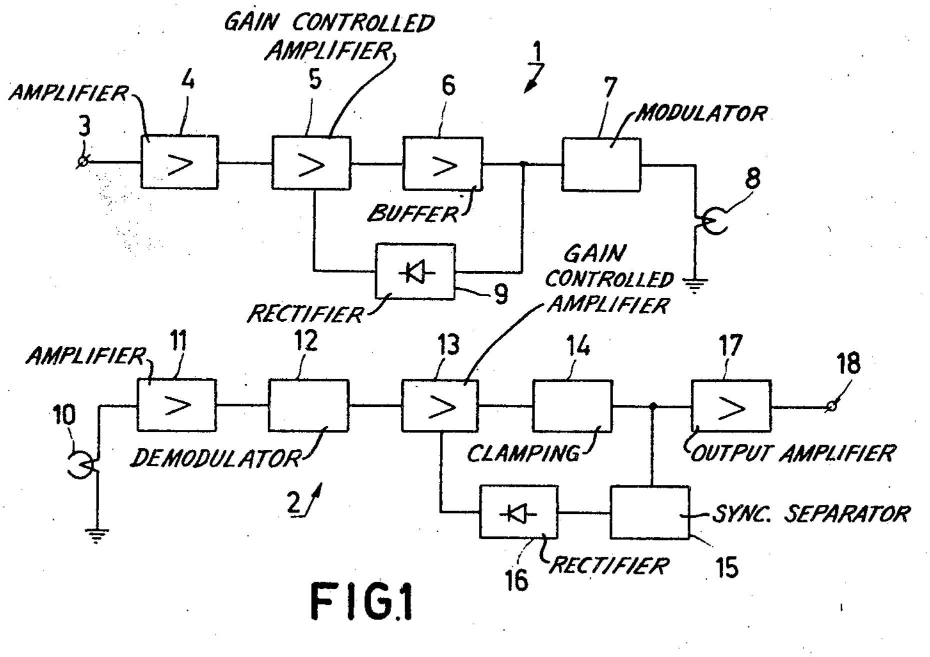
FIGURE 1 shows the block diagram of the recording and reproducing channels of a device according to the invention, in which the video information is recorded in the form of a frequency-modulator carrier.

In the block diagram of FIGURE 1 the recording and reproducing channels are indicated by 1 and 2 respectively. The video information to be recorded, comprising the picture content and the synchronising pulses, is fed to the input 3 of an amplifier 4 in which it is amplified and adjusted to the standard value, that is to say the given amplitude of the synchronising pulses. The amplifier 4 is followed by another amplifier 5 having a gain factor which is adjustable. The latter amplifier is preferably followed by an amplifier or buffer stage 6, whereafter the signal thus obtained is fed to a modulator 7 in which it is modulated as a frequency modulation on a carrier. The frequency-modulated signal is fed for recording purposes to a magnetic head 8, which may be of the rotary type such as usually employed for recording video information; as is well-known, it is possible to use more than one head.

The amplifier 5 is controlled by backward control. To obtain the control magnitude the video information, applied to the modulator 7, is rectified in a rectifying circuit 9. The total signal, that is to say the picture content together with the synchronising pulses, is advantageously rectified in a peak value rectifier. By means of this control signal the gain factor of amplifier 5 is influenced in a manner known per se.

The amplification of the recording channel is chosen to be such that in the absence of a control signal, with video information consisting of the synchronizing pulses and picture information corresponding to a black picture the modulator is already driven completely, that is to say, the carrier is modulated with the maximum degree of modulation permissible. If the picture information changes to a white picture, the total amplitude of the video information increases. Now the control sets in and controls down the gain factor of amplifier 5 until the total amplitude of the video information has again reached that value at which the maximum degree of modulation is obtained. In other words, the total amplitude of the video information, and hence the degree of modulation of the carrier wave, is maintained constant by the control.

Figure 2:
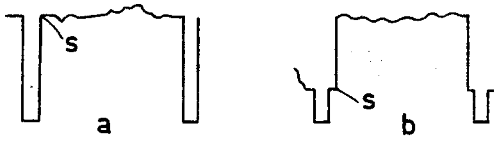
FIGURE 2 shows, by way of illustration of FIGURE 1, two curves of video information corresponding to two different kinds of picture information.

This is illustrated in FIGURE 2, which shows at *a* the total amplitude of the video information for a line period if the picture content is substantially black and at *b* if the picture content is substantially white. In either case, the porch is indicated by *s*. As a matter of fact, the control is active with a predetermined time constant which is preferably such that even short variations in the total amplitude cause response of the control but the control condition which is adjusting itself is then maintained for a plurality of fields.

It is thus ensured that the modulator is always operated at the maximum degree of modulation so that the signal ultimately recorded by the magnetic head is always optimum relative to the signal-to-noise ratio.

In the reproducing channel the signal scanned from the record carrier by a magnetic head 10 is amplified in an amplifier 11, whereafter the frequency-modulated signal is demodulated in a demodulator 12, so that at the output thereof, the video information is present again in the form such as fed to the modulator 7 in the recording channel. The said signal is now fed to an amplifier 13 having gain control. The amplifier 13 has connected to it a clamping stage 14 by means of which the porch of the video information is clamped at a constant potential in the usual manner. The output signal from the clamping stage 14 is fed to a stage 15 for separating the synchronising pulses. Since, during recording, the total amplitude of the video information was controlled, the amplitude of the synchronising pulses was also influenced as a function of the instantaneous control condition. Consequently the amplitude of the sychronising pulses separated in the reproducing channel is a measure of the degree of control which has been effected in the recording channel. From the amplitude of the synchronising pulses it is thus possible to derive a control signal for the reproducing channel which can neutralize the control which has taken place in the recording channel. To this end, the said pulses are preferably rectified in a peak value rectifier 16, the control signal thus obtained being fed to the amplifier 13. By means of this control the synchronising pulses are adjusted to a constant amplitude, preferably the standard value of, for example, 0.4 volt. (This value may differ slightly as a function of the television system.) However, the picture information the amplitude of which is also controlled, then automatically reassumes its initial value, so that the control effected in the recording channel is neutralized. The time constant of the control is, of course, chosen similar to that in the recording channel and preferably a little shorter. The signal thus controlled back appears therefore at the output of clamping stage 14 and may thence be fed, for example, via an output amplifier 17, to an output 18 where it is available for reproduction, for example in a television receiver.

A considerable improvement in the signal-to-noise ratio is thus obtained relative to the known method of recording and reproducing video information.

Figure 3:
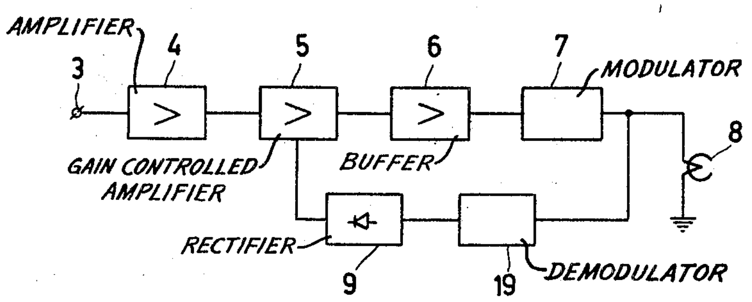
FIGURE 3 shows the block diagram of one embodiment of the recording channel which has been modified relative to the recording channel of FIGURE 1.

FIGURE 3 shows the block diagram of a recording channel in which the control signal is obtained only after the modulator 7. To this end, the output of the modulator 7 is followed by a demodulator 19, for recovering the video information, whereafter a rectifying device for producing the control signal follows. This control signal controls the amplifier 5, as has previously been described. Since in this embodiment the modulator 7 is also included in the control circuit, fluctuations in the degree of modulation resulting from the modulator itself are also compensated, so that the degree of modulation is always optimum.

Figure 4:
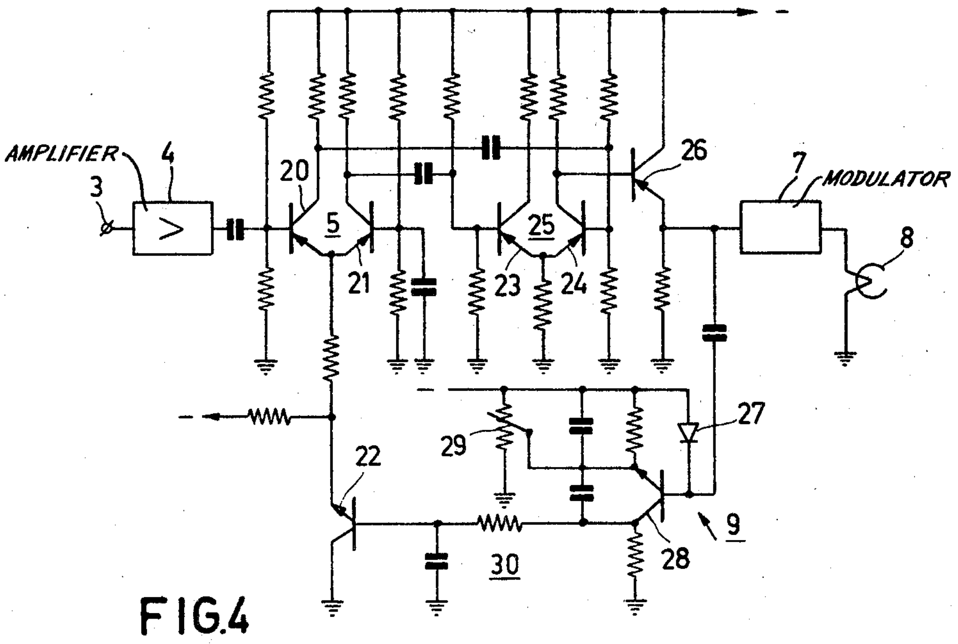
FIGURE 4 shows a diagram of the control circuit in the recording channel of FIGURE 1 in detail.

The recording channel of FIGURE 1 is shown further elaborated in FIGURE 4. From the input 3 the video information reaches, via the amplifier 4, the controlled amplifier 5. The latter comprises two transistors 20 and 21, the emitters of which are connected together and with which a transistor 22 is connected in series. The transistor

22 causes the amplification of the transistors 20 and 21 to vary as a function of the control magnitude fed to its base. Since the base of transistor 21 is connected to earth for alternating current and the video information is fed only to the base of transistor 20 it occurs at the collectors of the transistors 20 and 21 in phase opposition. Consequently it is fed to individual transistors 23 and 24, respectively, of a difference amplifier 25. From the collector of transistor 24 the video information is passed on to an emitter follower 26 and thence ultimately reaches the modulator 7. The output of the emitter follower 26 has also connected to it the rectifying device 9 for producing the control magnitude. The rectifying device 9 comprises a diode 27 and a transistor 28 the emitter of which receives, via a potentiometer 29, an adjustable bias potential which permits of selecting the threshold value at which the control sets in. The collector of transistor 28, at which the rectified video information occurs in the form of a control signal, is connected through a filter element 30 to the base of transistor 22.

When the video information for a substantially black image which comprises the synchronising pulses and the picture content reaches the input 3, the rectifying device 9 is given a bias potential by means of the potentiometer 29 such that it does not respond yet. Transistor 22 is in this case conducting and the transistors 20 and 21 operate with full amplification. The signal which reaches the modulator 7 has in this case an amplitude such as to bring about a maximum degree of modulation. If, now, the picture content changes towards a white image, the total amplitude of the video information increases so that the rectifying device responds, that is to say transistor 28 becomes conducting and hence its collector potential becomes less positive with the result that transistor 22 becomes conducting to a lesser extent. Consequently the emitter current in the transistors 20 and 21, and hence their amplification, decreases in such manner that the maximum value of the total amplitude of the video information is adjusted to a level at which the maximum degree of modulation permissible exists again and which is not exceeded.

The difference amplifier in the present case serves to compensate for interfering influences of the control. In fact, the control signal reaches the control electrodes of the transistors 20 and 21 with the same phase so that variations therein are transferred to the transistors 23 and 24 of the difference amplifier likewise with the same phase. However, as is well-known, a signal which reaches a difference amplifier in the same phase is not amplified by it, in contrast with the video information which is fed to the input electrodes of the transistors 23 and 24 with phases which are shifted by 180°.

Figure 5:
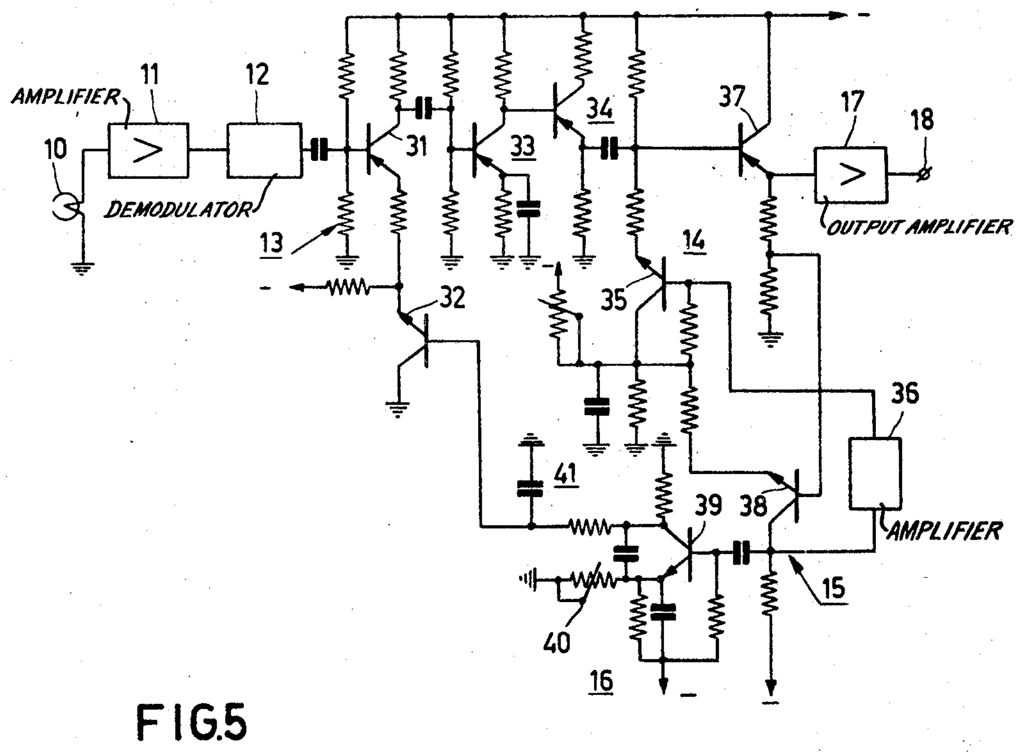
FIGURE 5 shows a diagram of the control circuit in the reproducing channel for the device of FIGURE 1 in detail.

FIGURE 5 shows the diagram of the control circuit of the reproducing channel of FIGURE 1. The signal scanned by the reproducing head 10, amplified in the amplifier 11 and demodulated in the demodulator 12 reaches as video information of constant maximum total amplitude, the input of the controlled amplifier 13. This amplifier comprises a transistor 31 the emitter circuit of which includes a transistor 32 to the base of which the control magnitude is fed. From the collector of transistor 31 the video information reaches the clamping stage 14 via a further amplifying stage 34 and an emitter follower 34. The clamping stage 14 comprises a transistor 35 to the collector of which an adjustable direct voltage and to the base of which synchronising pulses differentiated and amplified in a stage 36 are applied so that the potential at which the porch of the video information lies is determined. The video information thus obtained is fed via an emitter follower 37 to a stage 15 for separating the synchronising pulses, which is formed by a transistor 38. The adjustment of transistor 38 is chosen to be such that only the synchronising pulses occur at the collector thereof. Said synchronising pulses are fed to a rectifier 16 which, in the present case, is formed by a transistor 39, The emitter of transistor 39 receives a supply voltage which is adjustable by means of a potentiometer 40 and with which the amplitude of the synchronising pulses is compared, said supply voltage causing the synchronising pulses to be rectified only after the bias potential is exceeded. Consequently the bias potential again constitutes the threshold value which determines the beginning of the control. The rectified voltage set up at the collector of transistor 39 constitutes the control magnitude which is transferred via a filter element 41 to the base of the transistor 32 which causes the gain control of transistor 31.

As previously mentioned, the operation of the control circuit in the reproducing channel is based upon the fact that the amplitude of the synchronising pulses is a measure of the degree of gain control which has been effected in the recording channel. The video information as a whole is thus set to its initial value by the rectified synchronising pulses as a control magnitude and this simply because the control steadily tends to adjust the synchronising pulses to a constant amplitude, which amplitude is adjustable by the choice of the emitter bias of transistor 38 and is preferably made equal to the standard value. As soon as the amplitude of the synchronising pulses at the base of transistor 31 exceeds the value at which the selected nominal value is reached, the control sets in due to transistor 39 becoming conducting and causes a decrease in amplification of transistor 31 by means of a downward control of the current in transistor 32.

Thus, video information in the initial form such as suitable for reproduction is available at the emitter of the emitter follower 37 and can be fed, possibly through another amplifier, to the output 18 to which, for example, a television receiver may be connected. For simplification of the circuit it is possible, as is usually the case, to use the circuit parts of the recording channel also in the reproducing channel. Thus, for example, the transistors 20, 22 of the controlled amplifier 5, the transistor 24 of the difference amplifier 25 and the emitter follower 26, which are present in the recording channel, could undertake the function of the transistors 31, 32, 34 and 35 in the reproducing channel.

As a matter of fact, the invention is not limited to the device above described. The invention is applicable as well, for example, if the video information is recorded directly instead of as a frequency-modulated signal. In this case the amplitude-controlled signal is recorded directly.

What is claimed is:

1. A device for recording and reproducing video information having synchronizing pulses and a varying degree of signal level modulating a carrier wave, comprising a recording channel including a first adjustable gain means, means applying said video information to said first adjustable gain means, a first control signal means responsive to said video information for producing a first control signal corresponding to the degree said signal level varies from an optimum level, said first adjustable gain means responsive to said control signal for varying the gain of said first adjustable gain means to produce a gain adjusted video information signal adjusted to said optimum level, and a reproducing channel including a second adjustable gain means, means applying said gain adjusted video information signal to said second adjustable gain means, a second control signal means responsive to said gain adjusted video information signal for producing a second control signal corresponding to the degree of gain adjustment in said recording channel, said second adjustable gain means responsive to said second control signal for restoring said gain adjusted video information signal to its original condition.

2. A device as claimed in claim 1, wherein said first control signal is obtained by rectification of the complete video information containing the synchronising pulses.

3. A device as claimed in claim 1, wherein the viden information is recorded in the form of a frequency-modulated carrier signal, said video information upon recording is first controlled in amplitude and thereafter converted into the frequency-modulated signal to be recorded.

4. A device as claimed in claim 3, wherein said second control signal is obtained from said frequency modulated signal by demodulation and rectification.

5. A device for recording and reproducing video information with respect to a record carrier, comprising a recording channel including a first gain controllable amplifier, means applying to said first gain controllable amplifier a video information signal composed of a sequence of varying signal levels and fixed level synchronizing pulses, a first rectifier circuit responsive to the output of said first amplifier for producing a first control signal corresponding to the variation of the total video information signal magnitude from a minimum amplitude, means applying said first control signal to said first gain controllable amplifier for adjusting the gain of said first amplifier to produce an adjusted video information signal of said minimum amplitude whereby the magnitude of the synchronizing pulse in the adjusted video signal is proportional to the degree of gain adjustment represented by said first control signal, and a reproducing channel including a second gain controllable amplifier, means applying said adjusted video information signal to said second gain controllable amplifier, a second rectifier circuit responsive to the magnitude of the synchronizing pulse portion of the adjusted video information signal output of said second gain controllable amplifier for producing a second control signal corresponding to said synchronizing pulse magnitude, means applying said second control signal to said second gain controllable amplifier for adjusting the gain of said second gain controllable amplifier for reinstating the adjusted video information signal to its original condition.

References Cited

UNITED STATES PATENTS 3,102,927 9/1963 Dillenburger.
3,271,513 9/1966 Marzan ------------- 178—6.6

ROBERT L. GRIFFIN, Primary Examiner
H. W. BRITTON, Assistant Examiner